May 20, 1924.
E. O. BENJAMIN
INSULATING SUPPORT
Filed Dec. 31, 1919
1,494,766
2 Sheets-Sheet 1
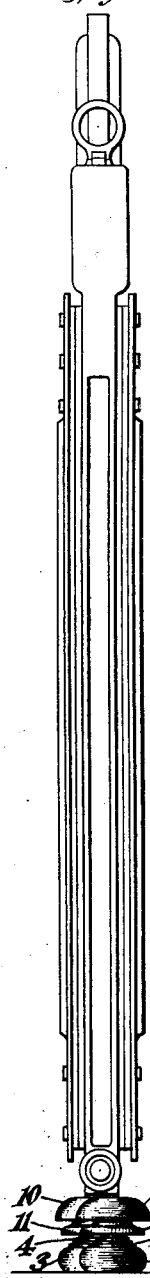
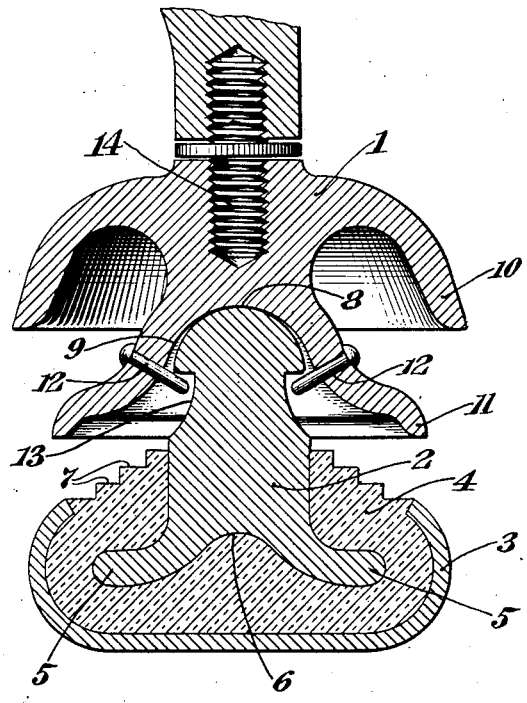
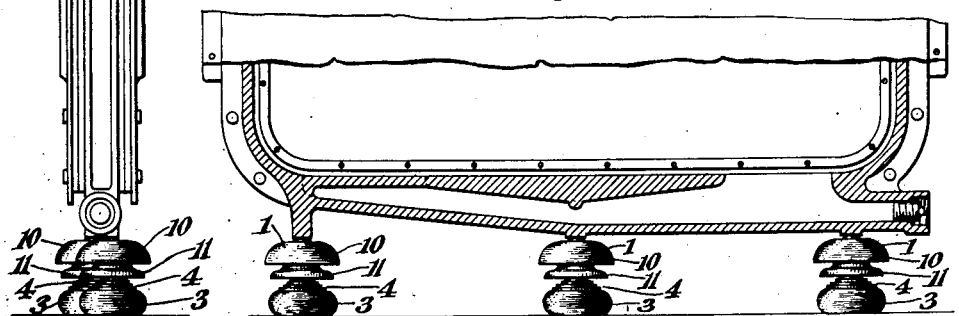
INVENTOR
Edward O. Benjamin
BY
George C. Ahlum ATTORNEY May 20, 1924.

E. O. BENJAMIN

INSULATING SUPPORT

Filed Dec. 31, 1919

Edward O. Benjamin, Inventor

By his Attorney

Patented May 20, 1924.

1,494,766

UNITED STATES PATENT OFFICE.

EDWARD O. BENJAMIN, OF NEWARK, NEW JERSEY, ASSIGNOR TO INTERNATIONAL OXYGEN COMPANY, A CORPORATION OF NEW JERSEY.

INSULATING SUPPORT

Application filed December 31, 1919. Serial No. 348,524.

*To all whom it may concern:*

Be it known that I, EDWARD O. BENJAMIN, a citizen of the United States, and resident of Newark, in the county of Essex and State of New Jersey, have invented certain new and useful Improvements in Insulating Supports, of which the following is a specification.

My present invention relates to supports, particularly adapted for use on electrolytic tanks. It was in fact designed for heavy, relatively thin and high electrolytic cells of the type shown in my application Serial No. 183,828, filed August 1st, 1917. While it is particularly adapted for that use, it will be obvious that it is capable of use in other relations and for other purposes.

The object is to provide an insulating support not likely to be short circuited by drip of conducting liquids; to have the construction such that the support will be self-adjusting for inequalities in the floor; and preferably also to provide for adjusting the height of the support with reference to the electrolytic cell or other apparatus supported thereby.

To this end my invention comprises a bell-like "petticoat" member adapted to shed liquids and to permit the same to drip off the periphery thereof at points beyond and outside of the space occupied by a cooperating insulating member.

The petticoat member and the insulating member are connected by a joint of the ball and socket type. Preferably the ball member is on an upright stud which is embedded in the insulating material and the latter is enclosed by and preferably cast within a tray or cup-like member of metal. The metal surfaces of the latter bear on the ground and prevents destruction or abrasion of the insulating material.

The bottom of the stud where it engages the insulation is preferably cupped, the curvature of the surfaces being such that forces perpendicular to the insulating material results in compression of the material in said cup, thus minimizing tendency of the insulating material to flow.

The non-conducting material is preferably of high insulating quality and preferably non-hygroscopic and materials best qualified in this particular, though not soft enough to flow easily are by no means rigid under heavy pressures. Hence the advantage of the above described arrangement of parts.

My invention will be more fully understood from the following description in connection with the accompanying drawings, in which—

Figures 1 and 2 show elevations of my insulating support as applied to a thin high electrolytic cell, Figure 1 showing the insulators viewed edgewise of the cell, and Figure 2 flatwise;

Figure 3 is a vertical axial section and

Figure 4:
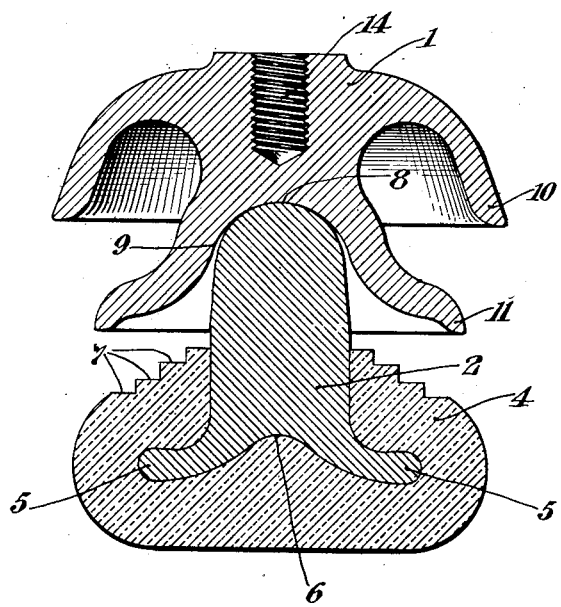
Figure 4 is a similar view of a modification.

In these drawings the upper member 1 is preferably an integral casting which need not be of non-conducting material and in practice is preferably cast iron. The lower member is composite comprising a stud 2, cup 3 and interposed insulating material 4. The stud 2 is preferably of cast iron and the exterior cup may be either of cast iron or of sheet metal. The lower end of the stud is formed with an annular flange 5 and is formed with a central domed or cupped recess 6 for holding the insulating material 4 as above described. The exterior cup 3 is formed as a container and the interposed insulation 4 is cast or molded in place preferably so that it is substantially equi-distant at all points from the flanges 5.

The exposed surface of insulation is provided with steps 7 so as to increase the surface area thereof thereby increasing the distance which leakage currents would have to traverse in order to flow from stud 2 to cup 3.

The lower surface of section 1 is curved, preferably as a segment of a sphere as at 8 and the upper end 9 of the stud 2 is formed on a curve of less radius and is preferably also spherical.

The upper member is provided with the petticoat flange 10 which is of greater diameter than the cup 3, so that drip falling from the petticoat by gravity will fall outside of the cup 3 when the parts are in normal vertical position. There is preferably also a second flange or petticoat 11 below and preferably of smaller diameter than 10.

The proportion of parts is such that extreme tilting of the two sections on their ball and socket bearing surfaces will bring the edge of the lower petticoat 11 in contact with the insulation 4 rather than with the conducting cup 3. Moderate tilt within the angles likely to occur in practice will not materially affect the protection afforded by the petticoat. In all positions the lower petticoat affords considerable protection from lateral splash of conducting liquid. The double petticoat construction affords additional security from creeping of salt or other chemical deposits from the liquid, as for instance, soda or potash where solution of these salts are used. Such deposits being crystalline, hygroscopic and capillary in their nature might serve to cause liquid to creep from the edge of the petticoats along the surfaces and ultimately to bridge the insulation.

When used for my intended purpose, there is no necessity of providing means to retain the ball member 9 in the socket member 8. However, connecting means may be employed if desired, a form permitting angular play sufficient for most practical purposes being shown in the drawings as consisting of studs 12 projecting into annular groove 13 in stud 2.

As will be obvious from Figures 1 and 2, full and equal bearing of all supports may be very necessary. Therefore I provide threaded stud 14 for connecting the upper section 1 with the cell. This stud may be initially adjusted by screwing it in or out of the member supported thereby if desired. In any event the screw connection with section 1 permits adjustment to be made at any time by simply rotating said section on the ball socket joint as a swivel, the petticoat being used as a hand wheel for this purpose. As the friction between the ball and socket surfaces and the friction at the screw stud are both very slight, the screwing may be easily effected until the full share of the load is taken by each support, even though that load be very heavy.

In Figure 4 I have shown a modification wherein the insulating material moulded about the stud is of sufficient rigidity so that the exterior cast iron cup is unnecessary and is omitted. A further feature consists in casting the stud without the undercut cylindrical recesses which are rendered unnecessary by omission of the retaining pins employed in Figure 1. These modifications all tend to decrease the cost without impairing the usefulness of those features of my invention which are common to both forms.

I claim:

1. An insulating support, consisting of an upper section and lower section connected by a universal joint, the upper section being entirely of cast iron and having at the top thereof an axial screw threaded recess and an adjusting screw threaded therein having its projecting upper end formed with a thread, and the lower surface of said upper section being formed as one member of the universal joint; and said lower section having its lower portion of insulating material in which the lower end of its upper portion is embodied and the upper end of said upper portion of said lower section being formed as the other member of said universal joint.

2. An insulating support, consisting of an upper section and lower section, the upper section being entirely of cast iron and having at the top thereof an axial screw threaded recess and an adjusting screw with its lower end threaded therein and having its upper end formed with a thread engaging a threaded recess in the device to be supported, and the lower surface of said upper section being formed with a spherical concavity; and said lower section comprising a mass of insulating material and a stud having a hemispherical head seated in said concavity and an annularly projecting base embedded in said insulating material.

3. An insulating support, consisting of an upper section and a lower section, connected by a universal joint, the lower section comprising a cast iron cup having a broad flat bottom and sides curving upwardly and inwardly, and a cast iron stud formed at the upper end for universal joint support of said upper section, said stud being formed with a broad annular base flange within said cup, and insulating rubber compound electrically separating but structurally binding said cup and annular flange in spaced relation.

4. An insulating support, consisting of an upper section and a lower section, connected by a universal joint, the lower section comprising a mass of insulating material having a broad flat bottom and sides curving upwardly and inwardly, and a cast iron stud formed at the upper end of the lower section for universal joint support of said upper section, said stud being formed with a broad annular base flange within said mass of insulating material, the lower surface of the base of the stud adjacent the bottom of the said insulating material being recessed upwardly to afford positive engagement of the lower supporting surface with the insulation.

Signed at Newark, in the county of Essex, and State of New Jersey, this 30th day of December, A. D. 1919.

EDWARD O. BENJAMIN.